(12) United States Patent
Tso et al.

(10) Patent No.: US 10,280,106 B2
(45) Date of Patent: May 7, 2019

(54) MOLD FOR THERMALLY BENDING AUTOMOTIVE GLASS

(71) Applicant: FUYAO GLASS INDUSTRY GROUP CO., LTD., Fuzhou (CN)

(72) Inventors: Fai Tso, Fuzhou (CN); Kezhang Chi, Fuzhou (CN); Fu Liu, Fuzhou (CN); Jiangxing He, Fuzhou (CN); Guohai Zeng, Fuzhou (CN); Guoqiang Guan, Fuzhou (CN)

(73) Assignee: Fuyao Glass Industry Group Co., Ltd., Fuzhou (CN)

( * ) Notice: Subject to any disclaimer, the term of this patent is extended or adjusted under 35 U.S.C. 154(b) by 25 days.

(21) Appl. No.: 15/533,256

(22) PCT Filed: Sep. 24, 2015

(86) PCT No.: PCT/CN2015/090522
§ 371 (c)(1),
(2) Date: Jun. 5, 2017

(87) PCT Pub. No.: WO2016/165288
PCT Pub. Date: Oct. 20, 2016

(65) Prior Publication Data
US 2018/0257970 A1 Sep. 13, 2018

(30) Foreign Application Priority Data
Apr. 15, 2015 (CN) .......................... 2015 1 0176796

(51) Int. Cl.
*C03B 23/027* (2006.01)
(52) U.S. Cl.
CPC ................... *C03B 23/027* (2013.01)
(58) Field of Classification Search
CPC .................................................. C03B 23/027
See application file for complete search history.

(56) References Cited

U.S. PATENT DOCUMENTS

| 3,137,558 A | | 6/1964 | Oberstar | |
|---|---|---|---|---|
| 5,167,689 A | * | 12/1992 | Weber | C03B 23/027 65/106 |
| 5,186,730 A | * | 2/1993 | Weber | C03B 23/027 65/289 |

FOREIGN PATENT DOCUMENTS

| CN | 1187174 A | 7/1998 |
|---|---|---|
| CN | 2820857 Y | 9/2006 |

(Continued)

OTHER PUBLICATIONS

PCT International Search Report dated Jan. 19, 2016 for PCT Patent Application No. PCT/CN2015/090522.

(Continued)

*Primary Examiner* — Cynthia Szewczyk
(74) *Attorney, Agent, or Firm* — McAndrews, Held & Malloy, Ltd.

(57) ABSTRACT

A bending mold capable of thermally bending an automotive windscreen comprises a fixed frame and two movable frames. A curvature adjusting apparatus is additionally provided corresponding to the bottom of each movable frame. Each curvature adjusting apparatus comprises two sidings, two hooks and an adjusting lever. The adjusting lever is in parallel to the connection line of two hinge connection points of the movable frame and the fixed frame on the same side, and the tops of the two hooks are respectively hanged on two corresponding sidings at adjustable positions. The process of thermally bending automotive glass can be accomplished with the bending mold, and does not require installing an anti-gravity mechanism. It has the advantages of simple mold structure design, less amount of materials and so on.

20 Claims, 4 Drawing Sheets

(56) References Cited

FOREIGN PATENT DOCUMENTS

| CN | 101376559 A | 3/2009 |
|---|---|---|
| CN | 201301278 Y | 9/2009 |
| CN | 103748046 A | 4/2014 |
| CN | 104860513 A | 8/2015 |
| EP | 0830322 A1 | 3/1998 |
| EP | 0982271 A1 | 3/2000 |
| GB | 768485 A | 2/1957 |
| GB | 1179316 A | 1/1970 |
| JP | S61155338 U | 9/1986 |
| WO | 2002024588 A1 | 3/2002 |

OTHER PUBLICATIONS

Extended European search report issued in corresponding European application No. 15888985.7 dated Oct. 2, 2018.

\* cited by examiner

MOLD FOR THERMALLY BENDING AUTOMOTIVE GLASS

CROSS REFERENCE TO RELATED APPLICATIONS

This application is a national phase filing and claims the priority of International Patent Application No. PCT/CN2015/090522, having an International filing date of Sep. 24, 2015, which claims priority to Chinese Patent Application No. 201510176796.0, having a filing date of Apr. 15, 2015. Each of the preceding applications is hereby incorporated by reference in its entirety.

TECHNICAL FIELD

The present disclosure relates to the technical field of thermally bending glass, and particularly, to a mold capable of thermally bending an automotive windscreen, and more particularly, to a mold for thermally bending automotive glass without additionally providing an anti-gravity mechanism.

BACKGROUND

Generally, feeding automotive glass into a thermal bending furnace to perform the process of thermal bending is one of necessary steps for processing some automotive glass. The automotive glass to be thermally bent is loaded into a bending mold in the upper portion of the thermal bending furnace, and then is fed into the thermal bending furnace together with the bending mold for thermally bending.

In related art, the bending mold is fixed on a carrier, such that the automotive glass together with the bending mold is moved in the thermal bending furnace along with the carrier. For example, Chinese Patent CN102757169A discloses a bending furnace and method for bending a glass plate, and the mold of the furnace, which has a shape matched with the resultant shape of the molded glass, is fixed on a carrying device which is provided with two sidings and is movable through the bending furnace. Moreover, for example, Chinese Patents CN102701574A and CN102491624A disclose a secondary molding mold for thermally bending automotive glass, and a second molding frame of the mold comprises a movable outer frame and a fixed outer frame, the fixed outer frame being fixed on a base, the movable outer frame being hinged to the fixed outer frame, an anti-gravity mechanism being fixed together with the movable outer frame. As described in these patents, automotive glass to be thermally bent is placed on the bending mold for thermally bending, and when the automotive glass is thermally softened in the thermal bending furnace, by the action of the gravity of the automotive glass and the anti-gravity mechanism, the bending mold forms a molding surface matched with the resultant shape of the automotive glass, and finally the automotive glass is brought into close contact with the bending mold, thereby accomplishing the thermal bending process. In actual use, such the bending molds have disadvantages of high cost, large size and large occupied space.

SUMMARY

The technical problem to be solved by the present disclosure is that the mold for thermally bending automotive glass in related art has the disadvantages of high cost, large size and large occupied space, and a mold for thermally bending automotive glass is provided.

The technical solution of the present disclosure for solving the technical problem is a mold for thermally bending automotive glass, comprising a fixed frame and two movable frames. The two movable frames are respectively hinged to the left and the right ends of the fixed frame. The two movable frames can be rotated about the respective hinged connection points, so as to form a bending surface with the fixed frame, and the bending surface has a curvature equal to the curvature of the resultant shape of the thermally bent automotive glass. A curvature adjusting device is correspondingly additionally provided at the bottom of each movable frame. Each curvature adjusting device comprises two sidings, two hooks and an adjusting lever. The adjusting lever is hinged to the bottom surface of the movable frame on the same side. The adjusting lever is in parallel to the connection line of the two hinged connection points of the movable frame on the same side and the fixed frame. The bottom ends of the two hooks are respectively fixed to the two ends of the adjusting lever, and the top ends of the two hooks are respectively hung on the two corresponding sidings at adjustable positions.

Furthermore, a plurality of through holes are formed in the siding, and the top end of the hook can be fixed in the corresponding through hole.

Furthermore, a groove or suspension rod is provided on the siding, and the top end of the hook can be fixed in the groove or on the suspension rod at adjustable positions.

Furthermore, a reinforcement rod is additionally provided at the bottom of each movable frame, the two ends of the reinforcement rod are respectively fixed on the two sides of the movable frame, and the reinforcement rod is in parallel to the adjusting lever on the same side.

Furthermore, a positioning rod is additionally provided in the middle of the reinforcement rod, two positioning blocks are additionally provided on the adjusting lever on the same side, and the positioning rod is supported by the adjusting lever and is located between the two positioning blocks.

Furthermore, a hinge adjusting device is additionally provided below each hinged connection point of the movable frame and the fixed frame. The hinge adjusting device comprises a first fixed base, a second fixed base, a hinged plate and an adjusting bolt. The first fixed base is fixed to the bottom surface of the movable frame. The second fixed base is fixed to the bottom surface of the fixed frame. The first fixed base and the second fixed base are arranged to be opposite to each other. A threaded through hole is formed in the second fixed base. The adjusting bolt extends through the threaded through hole. One end of the hinged plate is hinged to the first fixed base, and the other end of the hinged plate is fixed to the tip end of the adjusting bolt.

With the bending mold for automotive glass according to the present disclosure, the process of bending for automotive glass can be accomplished, and does not require installing an anti-gravity mechanism. It has the advantages of simple mold structure design, less amount of materials and so on. Furthermore, it also has the advantages of light weight, convenience for use, low cost and low power consumption, and is advantageous for energy conservation and environment protection. In addition, the omission of the anti-gravity mechanism enables the size of the entire mold to be smaller, and the storage space can be effectively reduced.

DETAILED DESCRIPTION

Figure 1:
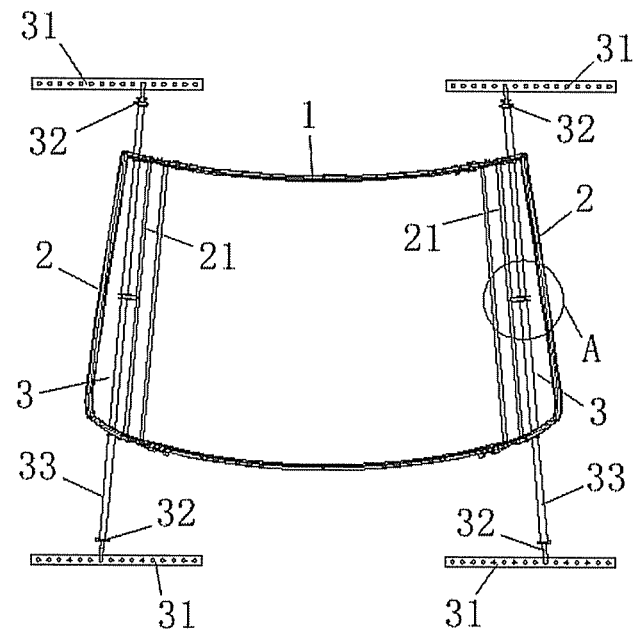
FIG. 1 is a schematic top view of a bending mold for automotive glass according to the present disclosure.
Figure 2:
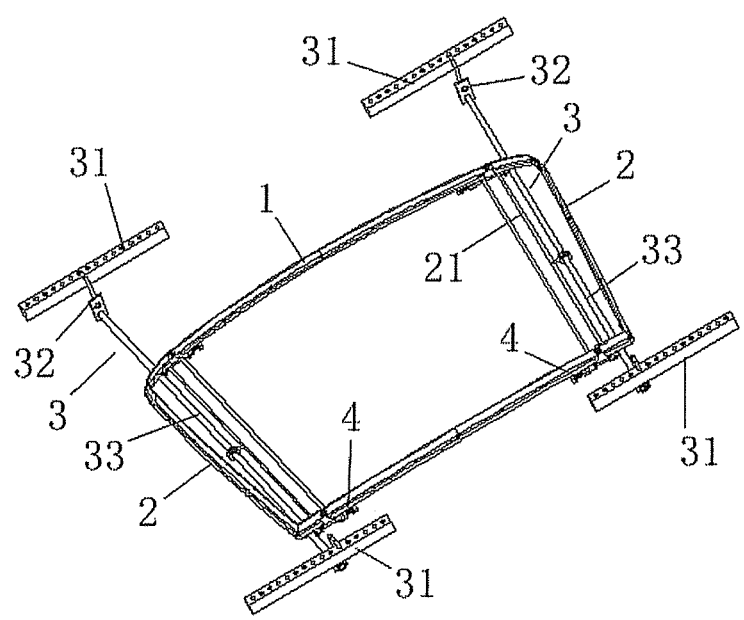
FIG. 2 is a schematic axial side view of the bending mold for automotive glass according to the present disclosure.

As shown in FIG. 1 and FIG. 2, a mold for thermally bending automotive glass according to the present disclosure can accomplish a process of thermally bending automotive glass without additionally providing an anti-gravity mechanism. The mold comprises a fixed frame 1 and two movable frames 2. The two movable frames 2 are respectively hinged to the left and the right ends of the fixed frame 1. The two movable frames 2 can be rotated about the respective hinged connection points, so as to form a bending surface with the fixed frame 1. The bending surface has a curvature equal to the curvature of the resultant shape of the thermally bent automotive glass. Since the automotive glass to be thermally bent is flat initially, the automotive glass to be thermally bent is supported by a part of the fixed frame 1 and the two movable frames 2 when it is placed on the bending mold. At this time, the automotive glass is not completely matched with the bending mold. When the automotive glass is gradually softened by thermally bending, the two movable frames 2 are also gradually rotated about the respective hinged connection points, and the automotive glass is gradually matched with the bending surface. Finally, the two movable frames 2 and the fixed frame 1 together form a bending surface, and the thermally bent and softened automotive glass is completely matched with the bending surface, thereby accomplishing the bending of the automotive glass.

Figure 3:
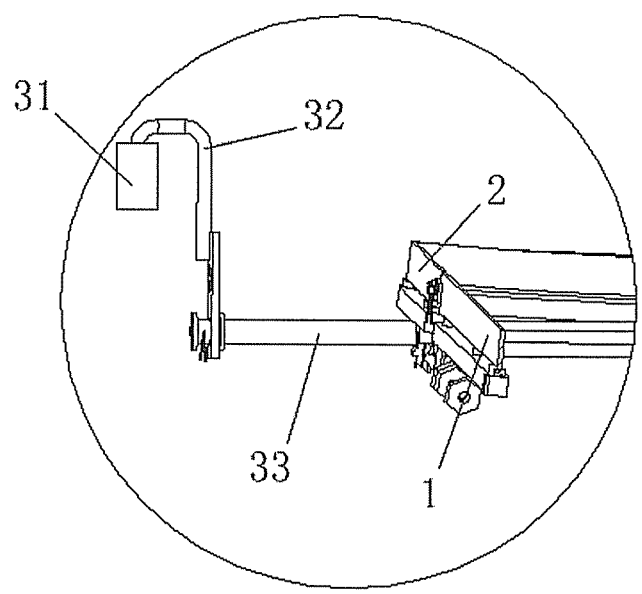
FIG. 3 is a schematic structural view of a curvature adjusting device according to the present disclosure.

In order to save materials for designing the mold and simplify the structure to omit the complex anti-gravity mechanism, a curvature adjusting device 3 is correspondingly additionally provided at the bottom of each movable frame 2 according to the present disclosure. As shown in FIG. 1, FIG. 2 and FIG. 3, each curvature adjusting device 3 comprises two sidings 31, two hooks 32 and an adjusting lever 33. The adjusting lever 33 is hinged to the bottom surface of the movable frame 2 on the same side. The adjusting lever 33 is in parallel to the connection line of the two hinged connection points of the movable frame 2 on the same side and the fixed frame 1. The bottom ends of the two hooks 32 are respectively hinged to the two ends of the adjusting lever 33, and the top ends of the two hooks 32 are respectively hung on the two corresponding sidings 31 at adjustable positions. In this way, the automotive glass to be thermally bent and the two movable frames 2 are gradually bent and rotated by means of the curvature adjusting device 3 during the process of thermal bending. Specifically, when the automotive glass to be thermally bent is placed on the bending mold, initially a part of the fixed frame 1 and the two movable frames 2 is in contact with the automotive glass to be thermally bent and supports it, since the automotive glass to be thermally bent is flat. As the automotive glass is gradually softened by thermally bending, the two movable frames 2 are lifted up and gradually rotated about the respective hinged connection points, by the action of gravity and the lever principle. The lower surface of the automotive glass is gradually brought into contact with the fixed frame 1 and the two movable frames 2, until the two movable frames 2 and the fixed frame 1 form a resultant bending surface. Finally, the automotive glass is completely matched with the bending surface, thereby accomplishing the process of thermally bending automotive glass.

Figure 4:
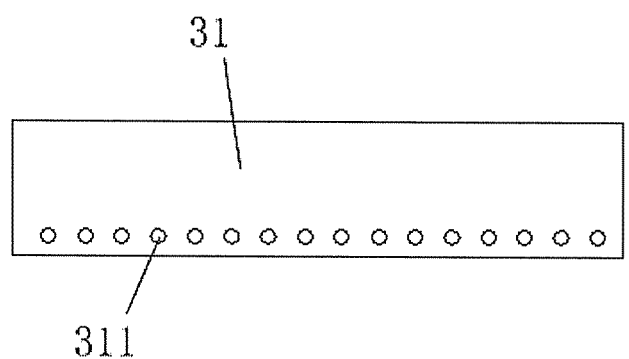
FIG. 4 is a schematic structural view of a siding according to the present disclosure.
Figure 5:
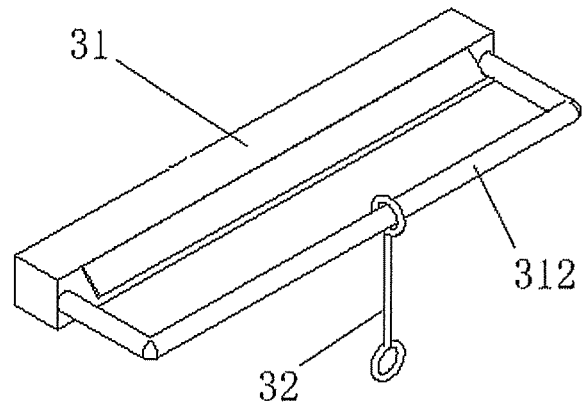
FIG. 5 is a schematic structural view of another embodiment of a siding according to the present disclosure.

As shown in FIG. 4, a plurality of through holes 311 are formed in the siding 31, and the top end of the hook 32 can be fixed in the corresponding through hole 311. In this way, the top ends of the hook 32 can be adjustably fixed in different through holes 311 according to different requirements, and in turn, the curvature of the bending surface formed by the two movable frames 2 and the fixed frame 1 can be adjusted, thereby meeting the requirements of different automotive glass by step-by-step adjustment. Naturally, the requirements of different automotive glass can also be met by stepless adjustment. As shown in FIG. 5, a groove (not shown) or suspension rod 312 is provided on the siding 31, and the top end of the hook 32 can be fixed in the groove (not shown) or on the suspension rod 312 at adjustable positions.

Figure 6:
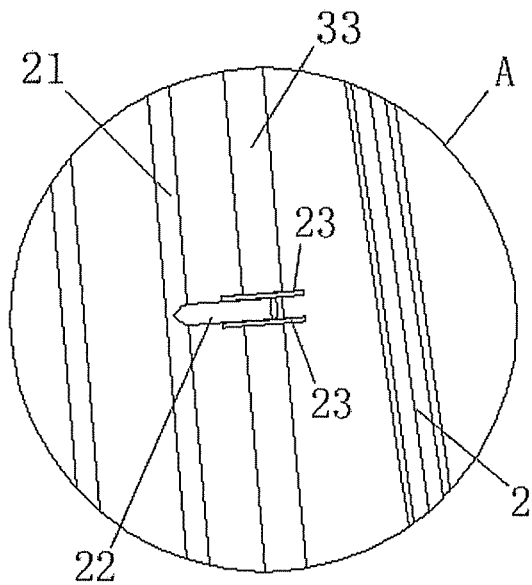
FIG. 6 is a partial enlarged view of an area A in FIG. 1.

Furthermore, in order to reinforce the movable frame 2 such that the movable frame is not readily deformed, a reinforcement rod 21 is additionally provided at the bottom of each movable frame 2. The two ends of the reinforcement rod 21 are respectively fixed on the two sides of the movable frame 2, and the reinforcement rod 21 is in parallel to the adjusting lever 33 on the same side, such that the curvature of the bent automotive glass may not be affected. Furthermore, in order to ensure that the movable frame 2 and the adjusting lever 33 do not slide with respect to each other, as shown in FIG. 6, a positioning rod 22 is additionally provided in the middle of the reinforcement rod 21, and two positioning blocks 23 are additionally provided on the adjusting lever 33 on the same side. The positioning rod 22 is supported by the adjusting lever 33 and is located between the two positioning blocks 23, such that the curvature of the thermally bent automotive glass may not be affected.

Figure 7:
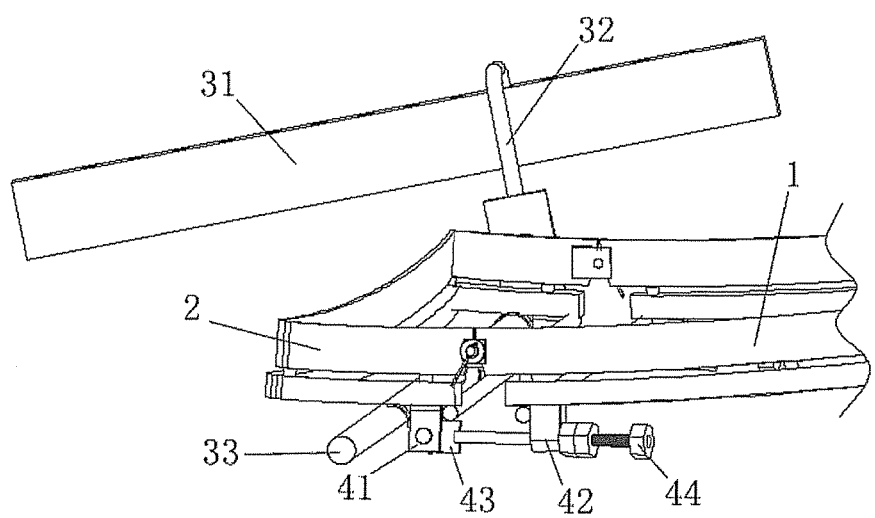
FIG. 7 is a schematic structural view of a hinge adjusting device according to the present disclosure.

As shown in FIG. 2 and FIG. 7, a hinge adjusting device 4 is additionally provided below each hinged connection point of the movable frame 2 and the fixed frame 1. The hinge adjusting device 4 comprises a first fixed base 41, a second fixed base 42, a hinged plate 43 and an adjusting bolt 44. The first fixed base 41 is fixed to the bottom surface of the movable frame 2, the second fixed base 42 is fixed to the bottom surface of the fixed frame 1, and the first fixed base 41 and the second fixed base 42 are arranged to be opposite to each other. A threaded through hole is formed in the second fixed base 42, and the adjusting bolt 44 extends through the threaded through hole. One end of the hinged plate 43 is hinged to the first fixed base 41, and the other end of the hinged plate 43 is fixed to the tip end of the adjusting bolt 44. In this way, by adjusting the adjusting bolt 44, the curvature of the bending surface formed by the two movable frames 2 and the fixed frame 1 can be adjusted, and the matching degree of the automotive glass with the bending mold can be regulated, so as to control the resultant width of the molded automotive glass.

The bending mold for automotive glass according to the present disclosure is described in detail hereinbefore. However, the present disclosure is not limited by the above described embodiments, and any improvements, equivalent modifications and substitutions within the spirit of the present disclosure are intended to be within the protection scope of the present disclosure.

What is claimed is:

1. A mold for thermally bending automotive glass, comprising a fixed frame and two movable frames, the two movable frames are respectively hinged to the left and the right ends of the fixed frame, the two movable frames are rotatable about the respective hinged connection points, so as to form a bending surface with the fixed frame, and the bending surface has a curvature equal to the curvature of a resulting shape of the thermally bent automotive glass, wherein each of two movable frame further comprises a curvature adjusting device at the bottom of each movable frame, each curvature adjusting device comprises two sidings, two hooks and an adjusting lever, wherein the adjusting lever is hinged to the bottom surface of the movable frame on the same side, the adjusting lever is parallel to the connection line of the two hinged connection points of the movable frame on the same side and the fixed frame, the bottom ends of the two hooks are respectively fixed to the two ends of the adjusting lever, and the top ends of the two hooks are respectively hung on the two corresponding sidings at adjustable positions.

2. The mold for thermally bending automotive glass according to claim 1, wherein each of the two corresponding sidings has a plurality of through holes.

3. The mold for thermally bending automotive glass according to claim 2, wherein the top end of the hook is attachable to the corresponding through hole.

4. The mold for thermally bending automotive glass according to claim 1, wherein each of the two corresponding sidings has a groove or suspension rod.

5. The mold for thermally bending automotive glass according to claim 4, wherein the top end of the hook is attachable to the groove or on the suspension rod at adjustable positions.

6. The mold for thermally bending automotive glass according to claim 1, wherein each movable frame has a reinforcement rod is-additionally provided at the bottom of each movable frame.

7. The mold for thermally bending automotive glass according to claim 6, wherein the reinforcement rod has a positioning rod is additionally provided in the middle of the reinforcement rod.

8. The mold for thermally bending automotive glass according to claim 7, wherein the positioning rod is supported by the adjusting lever.

9. The mold for thermally bending automotive glass according to claim 6, wherein the two ends of the reinforcement rod are respectively attached to the two sides of the movable frame.

10. The mold for thermally bending automotive glass according to claim 6, wherein the reinforcement rod is parallel to the adjusting lever on the same side.

11. The mold for thermally bending automotive glass according to claim 6, wherein the adjusting lever has two positioning blocks on the same side.

12. The mold for thermally bending automotive glass according to claim 11, wherein the positioning rod is located between the two positioning blocks.

13. The mold for thermally bending automotive glass according to claim 1, wherein each hinged connection point of the movable frame and the fixed frame has a hinge adjusting device.

14. The mold for thermally bending automotive glass according to claim 13, wherein the hinge adjusting device comprises a first fixed base, a second fixed base, a hinged plate and an adjusting bolt.

15. The mold for thermally bending automotive glass according to claim 14, wherein the first fixed base is attached to the bottom surface of the movable frame.

16. The mold for thermally bending automotive glass according to claim 14, wherein the second fixed base is attached to the bottom surface of the fixed frame.

17. The mold for thermally bending automotive glass according to claim 16, wherein the first fixed base and the second fixed base are disposed to be opposite to each other.

18. The mold for thermally bending automotive glass according to claim 16, wherein the second fixed base further comprises a threaded through hole.

19. The mold for thermally bending automotive glass according to claim 18, wherein the threaded through hole further comprises an adjusting bolt extends through the threaded through hole.

20. The mold for thermally bending automotive glass according to claim 19, wherein one end of the hinged plate is hinged to the first fixed base, and the other end of the hinged plate is attached to the tip end of the adjusting bolt.

* * * * *